(12) United States Patent
Iustin

(10) Patent No.: US 12,143,903 B2
(45) Date of Patent: Nov. 12, 2024

(54) VEHICLE NETWORK

(71) Applicant: Volvo Truck Corporation, Gothenburg (SE)

(72) Inventor: Roman Iustin, Mölnlycke (SE)

(73) Assignee: Volvo Truck Corporation, Gothenburg (SE)

( * ) Notice: Subject to any disclaimer, the term of this patent is extended or adjusted under 35 U.S.C. 154(b) by 167 days.

(21) Appl. No.: 17/677,032

(22) Filed: Feb. 22, 2022

(65) Prior Publication Data

US 2022/0286825 A1 Sep. 8, 2022

(30) Foreign Application Priority Data

Mar. 4, 2021 (EP) ..................................... 21160633

(51) Int. Cl.
*H04W 4/38* (2018.01)
*H04W 4/46* (2018.01)
*H04W 4/48* (2018.01)

(52) U.S. Cl.
CPC .............. *H04W 4/38* (2018.02); *H04W 4/46* (2018.02); *H04W 4/48* (2018.02)

(58) Field of Classification Search
None
See application file for complete search history.

(56) References Cited

U.S. PATENT DOCUMENTS

| | | | | |
|---|---|---|---|---|
| 9,925,921 B1* | 3/2018 | Deyaf | ..................... | B60Q 1/245 |
| 2008/0114502 A1* | 5/2008 | Breed | ..................... | B60R 21/235 |
| | | | | 701/2 |
| 2008/0238636 A1 | 10/2008 | Birging et al. | | |
| 2019/0090174 A1* | 3/2019 | Rocci | ..................... | H04W 48/02 |
| 2019/0118814 A1 | 4/2019 | Wood et al. | | |
| 2020/0238755 A1 | 7/2020 | Carr | | |
| 2020/0266850 A1 | 8/2020 | Eaton et al. | | |
| 2020/0280827 A1 | 9/2020 | Fechtel et al. | | |
| 2020/0287977 A1* | 9/2020 | Cui | ......................... | H04L 67/51 |

FOREIGN PATENT DOCUMENTS

DE 102010064086 A1 6/2012

OTHER PUBLICATIONS

Examination Report for European Patent Application No. 21160633.0, mailed May 21, 2024, 9 pages.
Extended European Search Report for European Patent Application No. 21160633.0, mailed Jul. 22, 2021, 9 pages.
Examination Report for European Patent Application No. 21160633.0, mailed Dec. 16, 2022, 8 pages.

* cited by examiner

*Primary Examiner* — Khalid W Shaheed
(74) *Attorney, Agent, or Firm* — Withrow & Terranova, PLLC

(57) ABSTRACT

A commercial vehicle comprises a plurality of wireless nodes fixed to points on the surface of the vehicle and configured to cooperate to form a vehicle network, wherein lines of sights between adjacent ones of the wireless nodes are sensibly unobstructed and/or sensibly parallel to the surface of the vehicle. The vehicle network may include additional wired links. A backhaul port provides Internet connectivity, at least intermittently, to the vehicle network. At least one of the wireless nodes is operable to act as wireless access point for mobile stations in the vehicle's vicinity and is optionally assisted by a wireless communication host.

15 Claims, 5 Drawing Sheets

VEHICLE NETWORK

RELATED APPLICATIONS

The present application claims priority to European Patent Application No. 21160633.0, filed on Mar. 4, 2021, and entitled "VEHICLE NETWORK," which is incorporated herein by reference in its entirety.

FIELD OF THE DISCLOSURE

The present disclosure relates to the field of vehicular information and communication technology. In particular, it proposes methods and devices for establishing a data network in a vehicle or across coupled vehicle units in a combination vehicle.

BACKGROUND

In recent years, with the development of advanced control and sensor technology, a need for reliable high-bandwidth data communication throughout a vehicle (including a combination vehicle) has emerged. For instance, real-time video data at 50 Mbps may be collected from sensors in a trailer and displayed in the driver cab of the tractor vehicle. In other applications, the sensor information is transferred to a networked (cloud) processing resource or a back-office location for further analysis and decision-making.

The use of wireless technology for collecting the sensor information simplifies mounting, may extend the technical lifecycle and involve other practical advantages compared to wired links, not least when the sensors are mounted on moving, heated or vibrating parts, such as tires and engine. For this purpose, the sensors are provided with radio interfaces designed to cooperate with a corresponding radio interface of a wireless sensor gateway (WSGW) connected to a vehicle network that assess the sensor information on to the driver cab, the central vehicle computer, or towards the back-office location. While core parts of the vehicle network are typically based on wired technology, early attempts have been made to use wireless infrastructure. These attempts have faced various difficulties. The variable geometry of vehicles and combination vehicles in particular (e.g., long-haul vehicles, Nordic combinations) may mean that standard network components cannot be used with their factory settings. Additionally, some metallic parts of the chassis and vehicle body may inconveniently shield, reflect or absorb radio-frequency waves.

SUMMARY

One objective of the present disclosure is to make available wireless vehicle network technology that is less affected by the problems reviewed above. A particular objective is to propose vehicle network infrastructure that lends itself to mounting in a wide range of vehicle geometries. Another objective is to propose vehicle network infrastructure that overcomes the shielding, reflection and/or absorption problem. It is finally an objective to utilize the vehicle network to supply devices in the vehicle's vicinity with Internet connectivity.

These and other objectives are achieved by the invention as defined by the independent claims. The dependent claims relate to advantageous embodiments.

In a first aspect of the present invention, a commercial vehicle comprises a plurality of wireless nodes fixed to points on the surface of the vehicle and configured to cooperate to form a vehicle network, wherein lines of sights between adjacent ones of the wireless nodes are sensibly unobstructed and/or sensibly parallel to the surface of the vehicle. The commercial vehicle further comprises a backhaul port configured to provide Internet connectivity, at least intermittently, to the vehicle network. At least one of the wireless nodes is operable to act as wireless access point for mobile stations in the vehicle's vicinity.

The vehicle network in the commercial vehicle is formed by mostly surface-mounted infrastructure and thereby evades problems related to electromagnetic shielding, reflection or absorption. The vehicle surface furthermore offers a multitude of potential mounting points, so that near-ideal spacing of the wireless nodes can be achieved relatively easily. Finally, the surface-mounted infrastructure, from which the vehicle network is formed, has an advantageous further use as a wireless access point for the benefit of mobile stations in the vehicle's vicinity. No comparable synergy would have been available in a wireless vehicle network where the radio links extend inside the vehicle body or where the wireless nodes are otherwise out of reach of external transceivers.

In some embodiments, the wireless nodes have different spatial transmit/receive patterns. Some wireless nodes may be equipped with directional antennas while others may have wide-angle antennas, as is deemed most suitable in the respective mounting locations. This economizes transmit power and keeps the received signals reasonably free from noise and interference.

In some embodiments, the wireless nodes may operate in the gigahertz range, such as at least 1 GHz, at least 5 GHz, at least 10 GHz, at least 30 GHz or at least 50 GHz. This frequency range achieves different degrees of intrinsic directivity, and it includes both unlicensed and licensable spectrum.

In some embodiments, at least one of the wireless nodes comprises a so-called intelligent antenna module (or radio-integrated antenna, or antenna-integrated transceiver, or integrated antenna module), which for purposes of the present disclosure signifies that the baseband circuitry is co-located with the antenna element(s), without a wired connection therebetween. The use of smart antenna modules enables a future migration from the low gigahertz frequency range to tens of gigahertz (e.g., 28-30 GHz) without massive energy losses. A carrier signal that travels in a coaxial cable of feasible outer dimensions is known to suffer significant attenuation at high frequency.

In some embodiments, at least one of the wireless nodes is physically integrated into a projecting part of the vehicle body, to be exemplified below. Such integration, whereby the wireless node is surrounded by free space to a greater extent, is likely to improve the transmit and receive angles under which it communicates with adjacent wireless nodes, and it may also be helpful to achieve unobscured lines of sight.

In some embodiments, the vehicle network has mesh-like topology. A mesh topology may include that multiple paths exist between a pair of nodes and/or that the nodes are not in a mutually hierarchic relation. The use of a mesh topology may render the vehicle network more robust to temporary breakdown of links and less error-prone on a system level.

In some embodiments, the wireless node acting as an access point is configured to provide Internet connectivity to sensors (including various Internet-of-Things devices with sensing capabilities), other vehicles and/or handheld devices. By sharing its Internet connectivity with these categories of devices, especially if they are located in areas outside cellular coverage, the commercial vehicle supplies a useful commodity that may add mutual value.

A further aspect relates to a plurality of wireless nodes. The wireless nodes are suitable to be fixed to points on the surface of a vehicle and configured to cooperate to form a vehicle network, wherein lines of sights between adjacent ones of the wireless nodes are sensibly unobstructed and/or sensibly parallel to the surface of the vehicle. The vehicle network to be formed includes a backhaul port configured to provide Internet connectivity, at least intermittently, to the vehicle network. At least one of the wireless nodes is operable to act as wireless access point for mobile stations in the vehicle's vicinity. This further aspect can be embodied with an equal degree of technical variation as discussed earlier in this section.

For purposes of the present disclosure, the fact that a line of sight is "sensibly parallel" to a vehicle's surface may refer to a partially imaginary surface of the vehicle, wherein depressions, recesses, gaps between structural elements and/or minor projecting objects have been disregarded. In other words, for the assessment of "sensibly parallel", the shape of the vehicle may be simplified or idealized, e.g., into a cuboid constituting a bounding box.

The term "Internet connectivity", when used herein, refers to the global Internet. The wireless nodes connecting to the wireless access point on the commercial vehicle shall be able to exchange communications with parties other than processors in the vehicle network itself. Accordingly, the mere ability of a sensor to forward data to a central vehicle computer via a nearby WSGW does not constitute "Internet connectivity" in the intended sense. Importantly, the exchange of communications must not proceed in real time, but the vehicle network may buffer inbound communications until it has regained coverage, and it may buffer outbound communications destined to the mobile stations while these are too distant.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
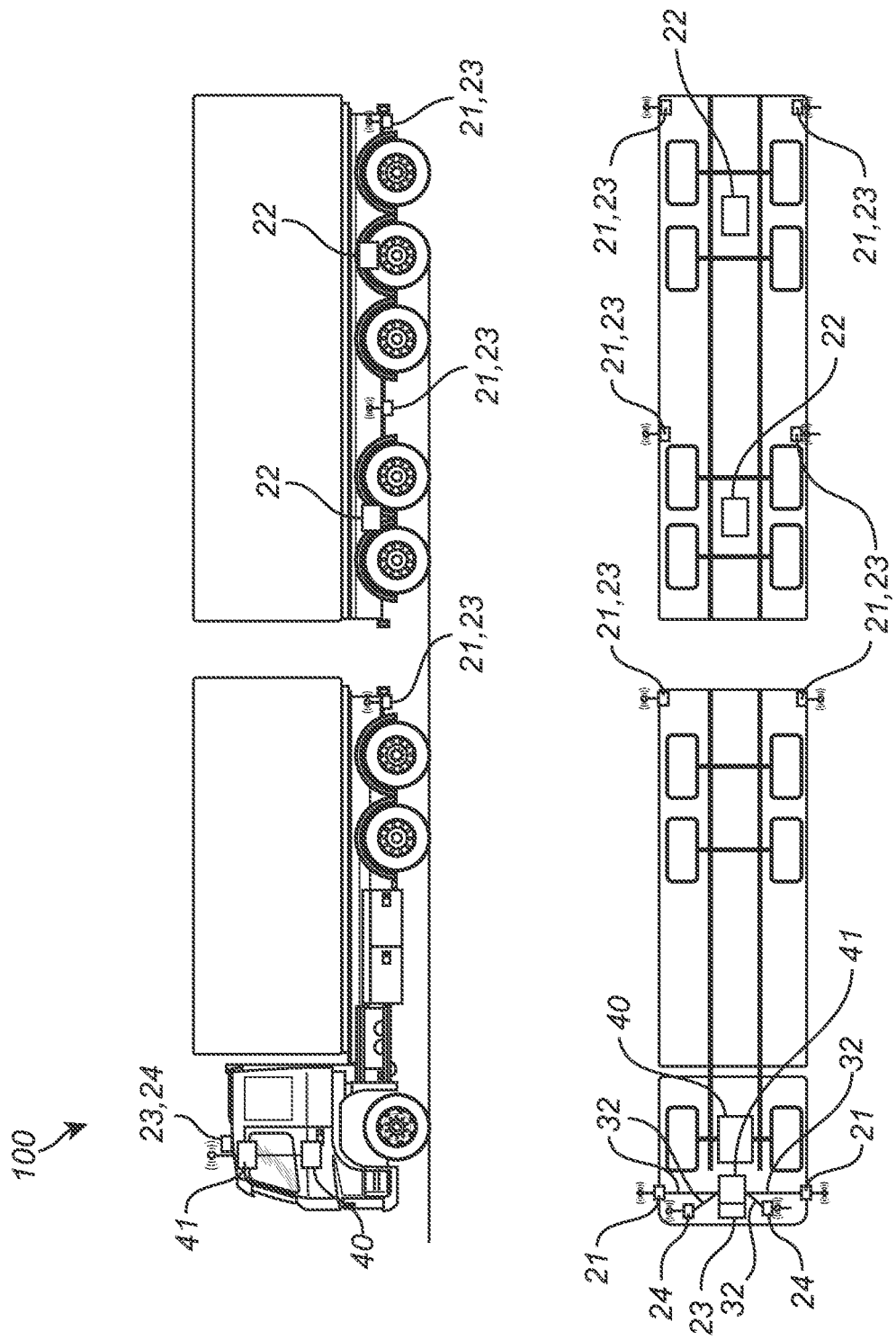
FIG. 1 includes a side view and a view from below of two vehicle units which can be coupled to form a combination vehicle and are equipped with multiple wireless nodes operable to form a vehicle network across the full combination vehicle.

The upper part of FIG. 1 is a side view of two vehicle units which can be coupled, e.g., using a drawbar, to form a combination vehicle 100. The vehicle units are equipped with multiple wireless nodes 21, 22, 23 operable to form a vehicle network across the full combination vehicle 100. Each wireless node may be configured to function as a wireless sensor gateway (WSGW) 22 for collecting measurement data from sensors in its vicinity, an ad hoc network access point 23 operable to serve mobile stations in the vicinity of the vehicle 100, an infrastructure node 21 or—as indicated by the use of multiple drawing references in FIG. 1—to fulfil a combination of these roles. While a WSGW 22 and an access point 23 are each configured to interface with external transceivers, the main function of an infrastructure node 21 is to maintain data links within the vehicle network, i.e., between itself and adjacent infrastructure nodes 21. The infrastructure nodes 21 may engage in multi-hop relaying of payload data between communication endpoints, e.g., to allow a central processor to collect data from distant sensors, but they may also initiate and receive communications of their own motion.

In the vehicle network, there are further provided cellular antennas 24 operable to connect to the global Internet. A modulated carrier signal may be supplied to the antennas 24 from baseband circuitry in the wireless communication host 41. The wireless communication host 41 may operate the antennas 24 as a distributed antenna system (DAS). The cellular antennas 24 may be mounted on the roof of the tractor unit of the combination vehicle 100. They shall be suitable to provide at least a mobile broadband service and may be compliant with at least one of the 3GPP standards UMTS (3G), LTE (4G) or NR (5G). A millimeter-wave transceiver, a local-area wireless transceiver or a satellite transceiver are alternative means that may deliver similar mobile broadband services. One of the antennas 24 may be of this alternative type, or dual transceivers of the same type may be provided for redundancy or spatial diversity. For example, the antennas 24 may for an NR-compatible antenna array. The point where the vehicle network interfaces with the cellular antennas 24 or their equivalents may be referred to as a backhaul port. For the purposes of the present invention, it is not essential that the backhaul port be connected to the global Internet at all times without interruption. Rather, some embodiments to be disclosed herein relate to vehicles that move between a first area with reliable Internet coverage and a second area where coverage is scarce and mobile stations in need of connectivity are expected to be found. These embodiments achieve their objectives even when the backhaul port experiences temporary interruptions of the connection to the global Internet.

Further connected to the vehicle network are a main processor 40 and a wireless communication host (or wireless communication manager) 41. The main processor 40 may be a telematic control unit (TCU) or a vehicle unit computer (VUC), which may fulfil coordinating responsibilities in the network and/or may be the initial recipient of sensor data collected by the WSGWs 22. The main processor 40 may include a basic software package (BSP) including an operating system, hardware drivers, hypervisor, safety/monitoring loops etc. as well as standardized or proprietary application programming interfaces (APIs). The wireless communication host 41 may comprise circuitry for generating and modulating carrier signals to be supplied to antennas, and may further execute software for monitoring and coordinating the ad hoc network wireless access points 23, e.g., by causing them to appear under a common network name, managing encryption and access control vis-à-vis connecting mobile stations, assisting handover between pairs of access points 23 and the like. The resulting vehicle ad hoc network may comply with one or more of the standards in the IEEE 802.11 series (Wi-Fi™) During vehicle maneuvering, such as turning, reversing etc., the coverage around the vehicle 100 will dynamically change. Since the access points 23 are integrated in the vehicle 100, the coverage offered to the external mobile stations will dynamically change as well. Data will be routed through the established vehicle network using antennas that provide best path.

As shown in FIG. 1, furthermore, the wireless communication host 41, the cellular antennas 24 and the two frontal infrastructure nodes 21—which are all in physical proximity—are interconnected by wired links 32, which may be relatively more reliable than wireless links and achieve a greater throughput for a given power consumption. In the embodiment shown in FIG. 1, the frontal access point 23 and the wireless communication host 41 are physically co-located; these devices may communicate over a wired link (not shown) or even an internal data bus.

Figure 2:
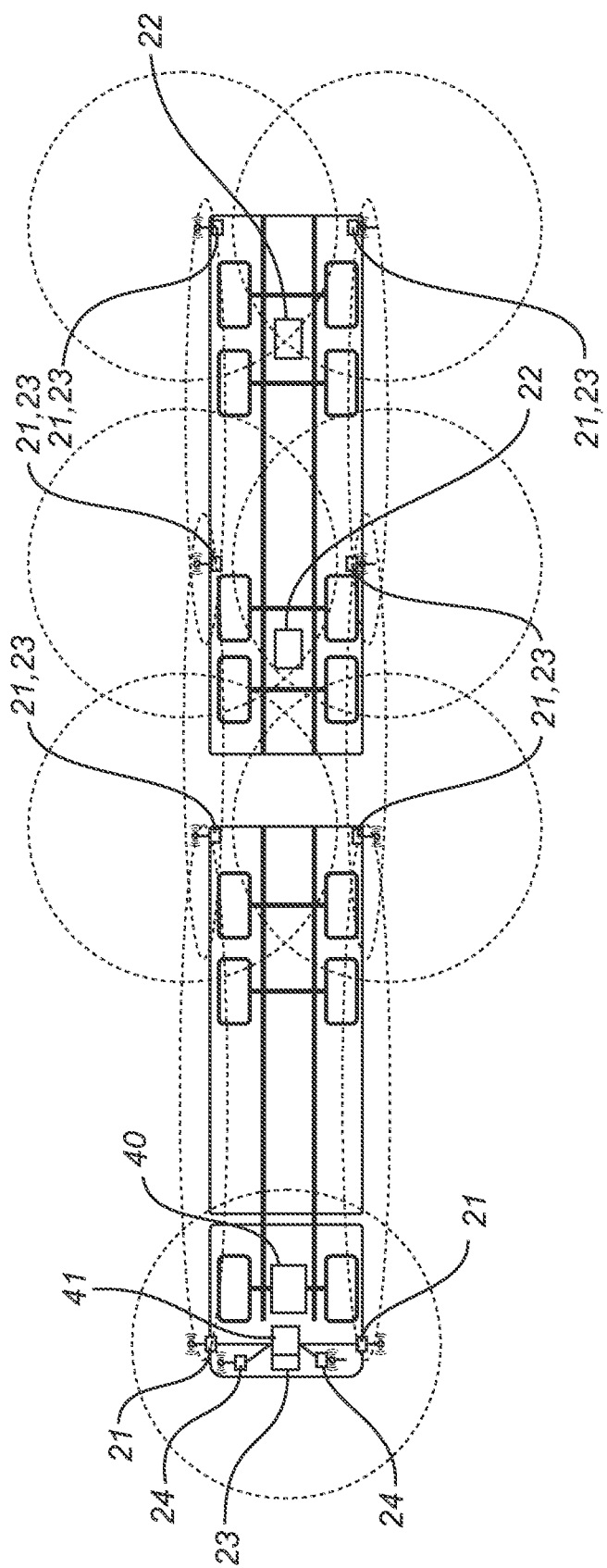
FIG. 2 is a view of the vehicle unit of FIG. 1 from below, in which approximate radiation patterns of the wireless nodes are indicated.

The same vehicle 100 is shown in FIG. 2, here with emphasis on antenna properties. More precisely, the circles and ellipses in dotted line represent approximate radiation patterns of the infrastructure nodes 21 and wireless access points 23 of the vehicle network. The visualizations of the patterns, which are essentially three-dimensional, may correspond to ground projections or to horizontal sections of the patterns at the height of an antenna center. The position of the dotted line at a given angle may correspond to a distance at which the radiation propagating in this angle has been attenuated down to a threshold intensity. Depending on their role in the network, the wireless nodes 21, 23 may have different radiation patterns. As illustrated in FIG. 2, the infrastructure nodes 21 may include directional antennas, and the access nodes 23 may have wide-angle antennas. The WSGWs 22 may be equipped with wide-angle antennas as well, and the radiation patterns of the WSGWs 22 are implicit in FIG. 2. The antennas may be intelligent antenna modules in the sense described above. All antennas may operate at frequencies of at least 1 GHz, such as at least 10 GHz, such as at least 50 GHz; the directional antennas and the wide-angle antennas may operate in mutually different frequency ranges. Different type of radio technologies could be integrated, some examples being IEEE 802.11, LTE, 5G NR, IEEE 802.15.4, sub-GHz radio (315/433), IEEE 802.11p (ITS-G5 interface), C-V2X (PC5 interface), DSRC, GNSS, mmWave, BLE and Satcom.

A wide-angle antenna in this sense may be implemented as an approximate omnidirectional antenna, for which the radiated power is approximately constant with respect to the azimuthal angle, or as an approximate isotropic antenna. An ideal dipole antenna may be omnidirectional. The 2.4 GHz antenna in IEEE 802.11 or IEEE 802.15.4 standards may be isotropic antennas. A directional antenna may be a single-element antenna or an antenna array with fixed or variable weights. The weights to be applied in the antenna array of an infrastructure node 21, which represent relative transmit powers and/or phase shifts, may be determined by optimizing the radio link to an adjacent infrastructure node 21 when the infrastructure nodes 21 are in their mounted positions. The optimization may aim to maximize the received fraction of the transmitted radio-frequency power; this may result in a narrow beam (pencil beam), as suggested by FIG. 2, which also reduces the vehicle network's exposure to eavesdropping, interception and integrity attacks. For such links that extend between articulated parts of the vehicle 100 (e.g., between a tractor and a trailer), however, it may be suitable to widen the beam slightly in the yaw direction.

Each infrastructure node 21 may entertain at least an uplink, which connects it to an adjacent infrastructure node 21 that is relatively closer to the main processor 40, and a downlink, which connects it to a different adjacent infrastructure node 21 which is, in the network topology, relatively more distant from the main processor 40. Each of the dotted ellipses that extends between a pair of adjacent infrastructure nodes 21 in FIG. 2 refers to the beam of the left node's 21 downlink and, at the same time, the right node's 21 uplink.

Figure 5:
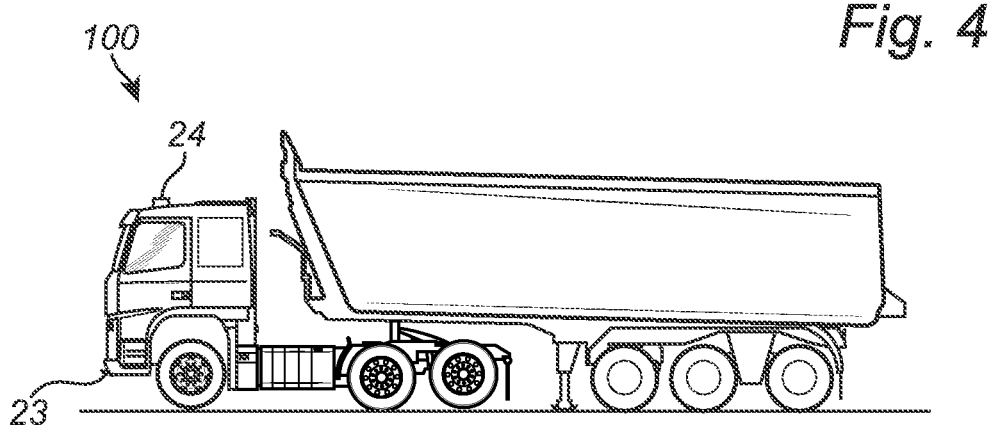
FIG. 5 includes a side view and a view from below of a commercial vehicle equipped with network infrastructure.
Figure 5:
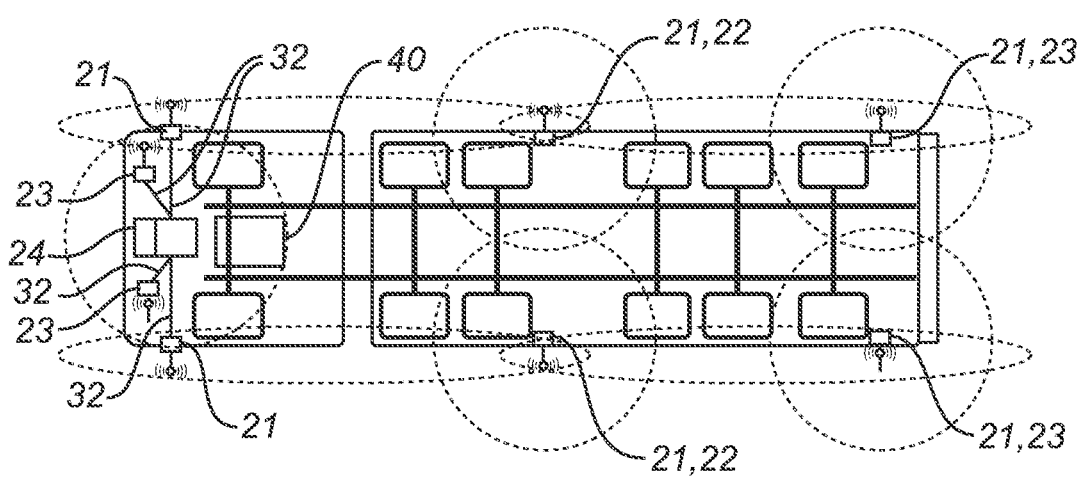

The upper part of FIG. 5 is a side view of a vehicle 100 composed of a trailer unit coupled via a fifth wheel and kingpin connection to a tractor unit. The lower part of FIG. 5 is a view from below of the same vehicle 100, wherein the rectangles refer to the approximate contours of the vehicle's 100 lateral surfaces. The vehicle 100 is equipped with infrastructure nodes 21, WSGWs 22, ad hoc network access points 23, a cellular antenna 24 and a main processor 41 with the corresponding functionalities as previously described. It is noted that the frontal access points 23 are not roof-mounted, like in FIG. 1, but arranged near the road level, in anticipation of intended connecting mobile stations. Antennas with different radiation patterns have been purposefully used for the infrastructure nodes 21 and access points 23, as indicated on the drawing.

While both FIGS. 1, 2 and 5 occasionally show combination vehicles 100, the present disclosure extends to single-unit vehicles 100 as well, whether they include an articulation point or not. The vehicles 100 may be passenger vehicles, such as buses, or construction equipment. The vehicles 100 may be conventionally operated, semi-autonomous or autonomous.

Figure 3:
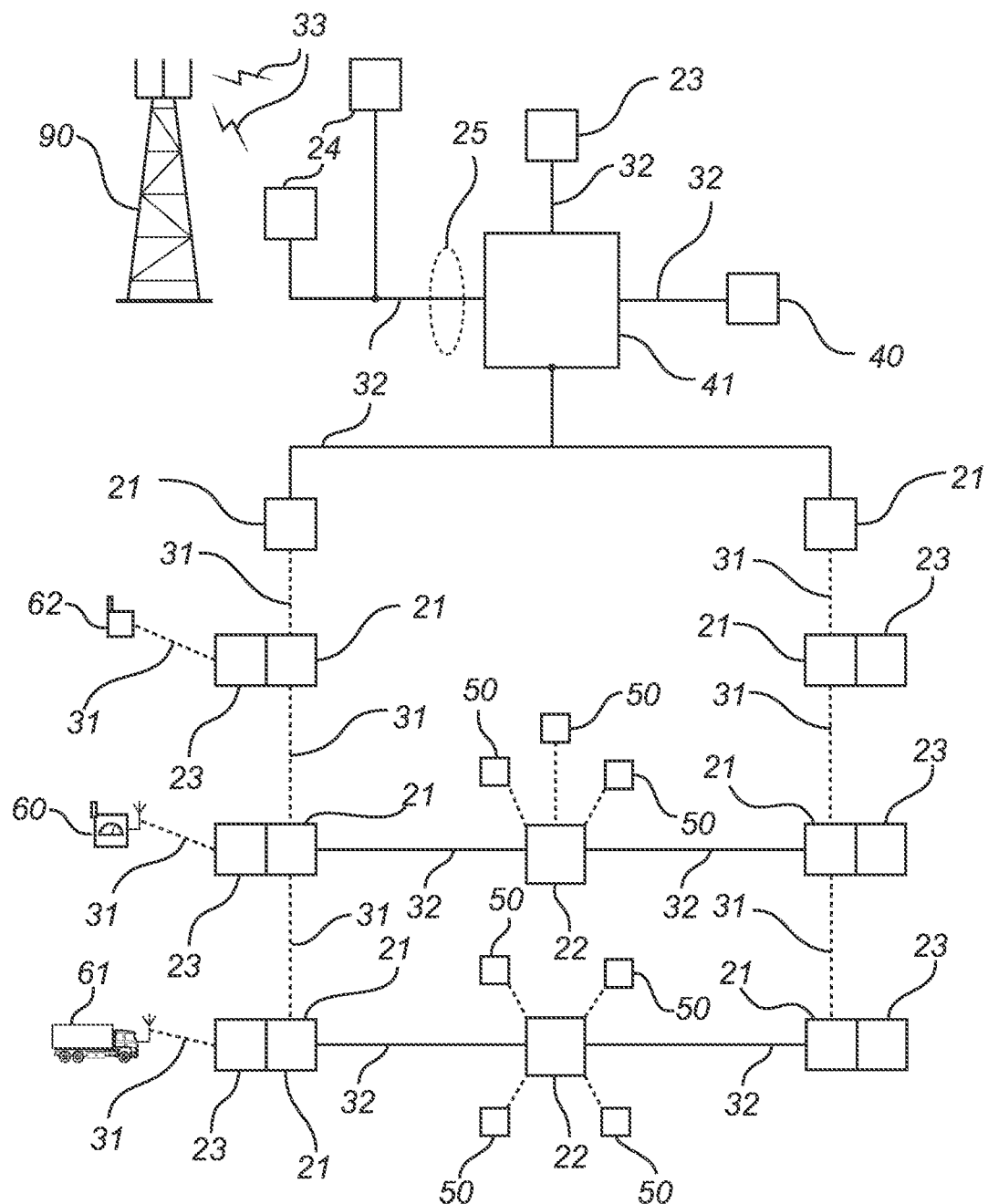
FIG. 3 is a functional block diagram of the vehicle network of the vehicle units shown in FIGS. 1 and 2.

FIG. 3 is a functional representation of the vehicle network 20 formed by the infrastructure components that were introduced with reference to FIGS. 1 and 2. FIG. 3 does not show any parts of the vehicle 100, though its vertical direction generally corresponds to the longitudinal (front-rear) axis of the vehicle 100. The infrastructure components, including the infrastructure nodes 21, WSGWs 22, ad hoc network access points 23, cellular antennas 24, main processor 40 and wireless communication host 41, reappear in FIG. 3. The backhaul port 25, where the vehicle network 20 interfaces with the connection towards the global Internet, has been indicated. In FIG. 3, furthermore, the network's 20 wireless links 31 are drawn in dashed line and wired links 32 in solid line. The vehicle network 20 may execute an Ethernet protocol or a Controller Area Network (CAN) protocol. While FIG. 3 shows a topology where the main processor 40 is connected to the vehicle network 20 via the wireless communication host 41, this disclosure also covers embodiments where the main processor 40 is directly connected, e.g., at the T-shaped junction point below the wireless communication host 41.

FIG. 3 moreover shows potential external communication parties, including a cellular base station 90 (e.g., an LTE eNodeB or 5G-NR gNodeB), with which the cellular antennas 24 communicate over cellular links 33. The radio access network (not shown), to which the cellular base station 90 belongs, is supported by a core network, which provides access to the global Internet.

The vehicle network 20, via the WSGWs 22, further communicates with sensors 50 in the vehicle. Traffic from the sensors 50 may include measurement data, and traffic towards the sensors 50 may for example carry transmit requests—especially if the sensors 50 are of a pollable type—or configuration data.

The mobile stations connecting to those wireless nodes that act as ad hoc network access points 23 are exemplified in FIG. 3 by an external sensor 60, another vehicle 61 and a handheld device 62. This disclosure's usage of the terms "mobile station" and "access point" is occasionally aligned with the terminology in IEEE 802.11 specifications, though compliance with any of these standards is by no means an essential feature of the invention. The communication between the access points 23 and the mobile stations 60, 61, 62 may be of the machine-to-machine (M2M) type or vehicle-to-anything (V2x) type, including the V2V, V2N and V2I subtypes.

The external sensor 60 may be a utility meter, i.e., a device for reporting a customer's consumption of electricity, gas, water or other commodities. Manual reading of utility meters has been largely abandoned but replaced with the relatively onerous practice of having the utility meters report readings over permanent Internet connections, via cellular subscriber modules or the like. A comparable reporting frequency can be achieved by installing a vehicle network 20 of the type described herein in a delivery vehicle, garbage collection vehicle, public transport vehicle or another vehicle that circulates periodically in the residential neighborhoods concerned. The wireless access points 23 of the vehicle network 20 will then provide the utility meters with intermittent connectivity on a periodic basis.

Another advantageous use case is related to mobile stations that are installed or operated in locations without reliable network coverage, including but not limited to subterranean environments (e.g., mines) and tunnels. The mobile stations may be machine-type devices or user equipment. A vehicle 100 equipped with the vehicle network 20 described herein, which circulates between said location without reliable network coverage and another location where the cellular antennas 24 can successfully establish a connection towards the global Internet, may supply these mobile stations with intermittent connectivity. For this purpose, components of the vehicle network 20 may buffer inbound communications from the mobile stations and outbound communications towards the mobile stations.

Figure 4:
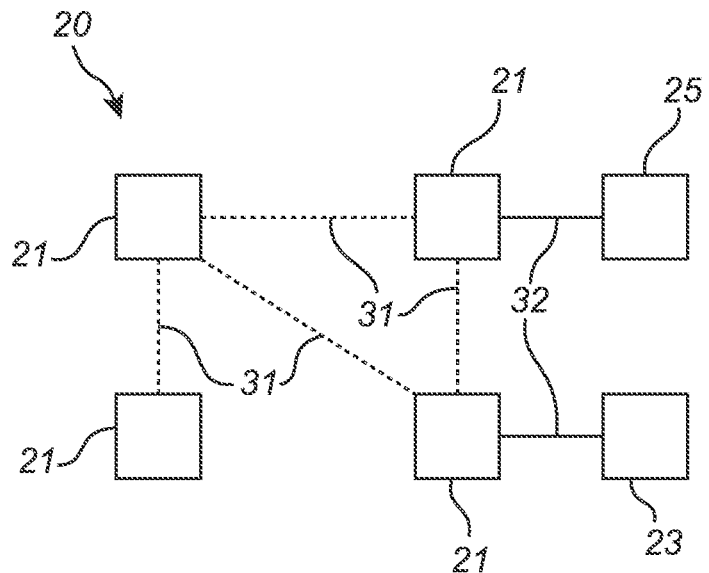
FIG. 4 is a functional block diagram of a further vehicle network.

FIG. 4 shows a vehicle network 20 including infrastructure nodes 21, an ad hoc network access point 23, a backhaul port 25, as well as wireless 31 and wired 32 links among these. The network 20 may have a mesh topology. More precisely, the top-left and the bottom-right infrastructure nodes 21 are connected by one direct wireless link 31 and one indirect (two-hop) wireless link 31 via the top-right infrastructure node 21. In different embodiments, the mesh topology may be partial, as shown in FIG. 4, or complete in the sense that all wireless nodes 21 have a direct wireless link 31.

Figure 6:
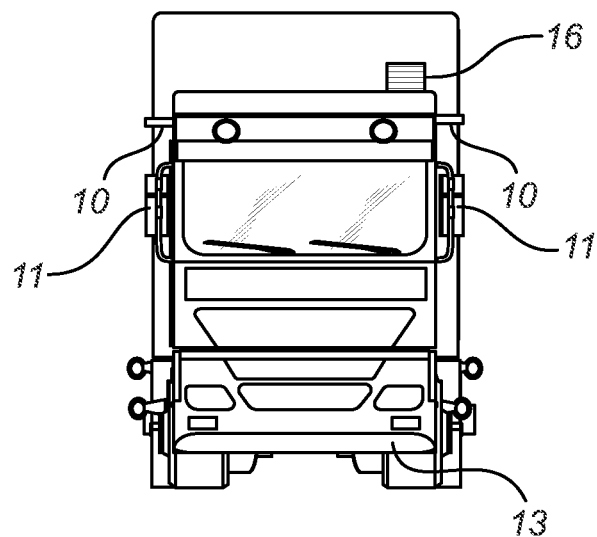
FIG. 6 is a front view of a commercial vehicle equipped with network infrastructure.

Suitable physical placement of the wireless nodes 21, 22, 23 of the vehicle network 20 will now be discussed with reference to FIGS. 6 and 7. FIG. 6, a front view of a commercial vehicle, indicates potentially suitable elements in which wireless nodes 21, 22, 23 can be integrated with a view to obtain lines of sights between adjacent ones of the wireless nodes that are sensibly unobstructed and/or sensibly parallel to the surface of the vehicle. These elements include a winglet 10 on the trailer, which may be mounted laterally on the driver cab, a side-view mirror 11 or a mirror arm of a side-view mirror 11, a bumper 13 and an air intake 16. The air intake 16 may be located at or above roof height of the trailer. Further suitable elements (not indicated in FIG. 6), in which the wireless nodes 21, 22, 23 can be integrated, include: a fin, a fender, a cab shield (i.e., a protective extension of the front edge of a tippable open-box bed), a sun visor above the windscreen and a radiator grille.

Figure 7:
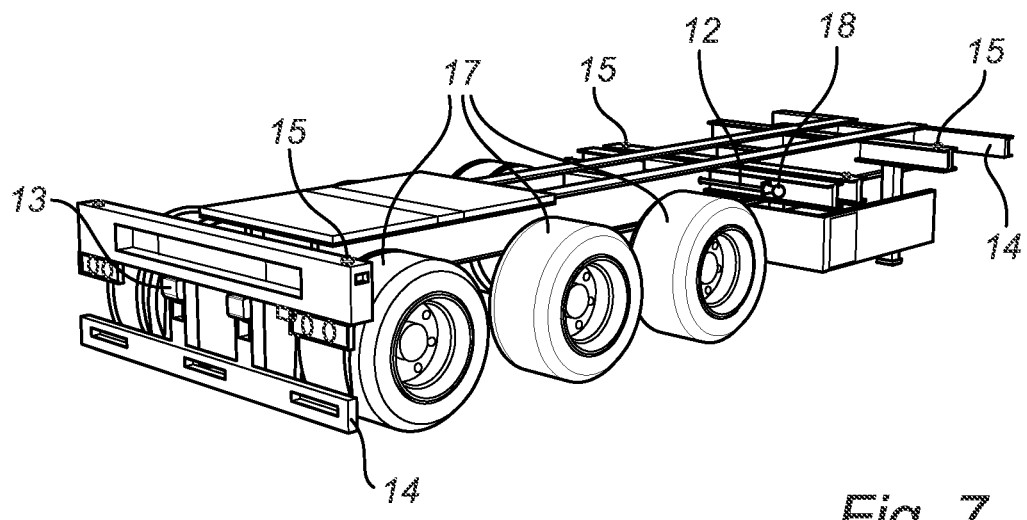
FIG. 7 is a perspective view of a trailer vehicle equipped with network infrastructure.

FIG. 7 is a perspective view of a trailer vehicle which shows, similar to FIG. 6, elements suitable for fitting network infrastructure components. These include an extender 12, a bumper 13, a front bolster 14, a rear bolster 14, a twistlock beam 15 and a mudguard 17. The sidelight 18 mounted on the extender 12, like other lighting components which are nowadays typically powered by semiconductor lighting elements (e.g., light-emitting diode, LED), shall be used with some caution, since LEDs and radio equipment may interfere mutually. Passive lighting elements (reflexes) and lighting elements powered by incandescent or other non-interfering technology may successfully absorb by wireless nodes 21, 22, 23, and even retrofitting of complete lighting elements may be an option. To be connected to other components of the vehicle network 20, a wireless node 21, 22, 23 which is physically integrated into an active lighting element may be equipped with a powerline communication interface. The wireless node 21, 22, 23 may then use the electric line which powers the lighting element to exchange data with a corresponding powerline communication interface of another component of the vehicle network 20. The communication may for example adopt elements of networking standards issued by the HomePlug Powerline Alliance.

The suitable elements that have been reviewed with reference to FIGS. 6 and 7 may generally be to can be characterized as projecting parts of the vehicle body. The projecting parts may belong to the vehicle body as originally manufactured or may have been added subsequently. Sensibly unobstructed lines of sights and lines of sights that are sensibly parallel to the surface of a vehicle 100 provide their maximum advantage when they join pairs of infrastructure nodes 21. Without considerable detriment, a WSGW 22 and a wireless access point 23 can be mounted without having a direct line of sight to another wireless node. The WSGW 22 or wireless access point 23, respectively, may instead communicate with the rest of the vehicle network 20 via a co-located infrastructure node 21 (cf. FIG. 3) or via a wired link 32 (cf. FIG. 4).

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A commercial vehicle comprising:
   a plurality of wireless nodes that are fixed to points on a surface of the vehicle and that cooperate to form a vehicle network having a mesh topology; and a backhaul port configured to provide Internet connectivity to the vehicle network, wherein:
- lines of sights between adjacent wireless nodes of the plurality of wireless nodes are sensibly unobstructed and/or sensibly parallel to the surface of the vehicle;
- each wireless node is configured to function as at least one of (a) a wireless sensor gateway for collecting data from sensors, (b) an ad hoc network access point for serving mobile stations in the vicinity of the vehicle, and (c) an infrastructure node for maintaining data links within the vehicle network;
- wireless nodes with different roles in the vehicle network have antennas with different radiation patterns; and
- the vehicle network is configured for routing data when the coverage offered to said mobile stations in the vehicle's vicinity dynamically changes as a result of vehicle maneuvering, wherein the data is routed using antennas that provide best path.

2. The commercial vehicle of claim 1, wherein at least one of the wireless nodes is the wireless sensor gateway.

3. The commercial vehicle of claim 1, wherein the plurality of wireless nodes includes at least one wireless node with a directional antenna and at least one wireless node with a wide-angle antenna.

4. The commercial vehicle of claim 1, wherein at least one of the wireless nodes comprises an antenna adapted for at least 1 GHz, such as for at least 10 GHz, such as for at least 50 GHz.

5. The commercial vehicle of claim 1, wherein at least one of the wireless nodes comprises an intelligent antenna module.

6. The commercial vehicle of claim 1, wherein at least one of the wireless nodes is physically integrated into a projecting part of the vehicle body.

7. The commercial vehicle of claim 6, wherein the projecting part is one or more of a winglet, a side-view mirror, a mirror arm, an extender, a fin, a fender, a cab shield, a sun visor, a bumper, a radiator grille, a front or rear bolster, a twistlock beam, an air intake, and/or a mudguard.

8. The commercial vehicle of claim 1, wherein at least one of the wireless nodes is physically integrated into a lighting component of the vehicle.

9. The commercial vehicle of claim 8, wherein the wireless node that is physically integrated into the lighting component comprises an interface for powerline communication.

10. The commercial vehicle of claim 1, wherein at least one of the mobile stations in the vehicle's vicinity is a sensor, another vehicle, and/or a handheld device.

11. The commercial vehicle of claim 10, wherein the sensor is a utility meter.

12. The commercial vehicle of claim 1, wherein the vehicle is an autonomous vehicle.

13. The commercial vehicle of claim 1, wherein the vehicle is adapted for subterranean or tunnel operation.

14. The commercial vehicle of claim 1, wherein the vehicle is a combination vehicle composed of two or more vehicle units, each of which comprises at least one wireless node.

15. The commercial vehicle of claim 1, wherein at least one of the plurality of wireless nodes are configured to function at least as the infrastructure node.

* * * * *